United States Patent
Rabe et al.

[11] Patent Number: 5,914,170
[45] Date of Patent: Jun. 22, 1999

[54] PROCESS AND MEANS FOR PRODUCING A SUPPORT PART AND A SUPPORT PART PRODUCED WITH IT

[75] Inventors: Jürgen Rabe, Höchstadt/Aisch; Ulf Rittinghaus, Marsberg, both of Germany

[73] Assignees: PiK Partner in Kunsttstoff, Hochstadt/Aisch; Hengste & Eckardt GmbH, Marsburg, both of Germany

[21] Appl. No.: 08/737,683
[22] PCT Filed: May 21, 1995
[86] PCT No.: PCT/DE95/00657
§ 371 Date: Jan. 30, 1997
§ 102(e) Date: Jan. 30, 1997
[87] PCT Pub. No.: WO95/32088
PCT Pub. Date: Nov. 30, 1995

[30] Foreign Application Priority Data

May 21, 1994 [DE] Germany ............................ 44 17 871

[51] Int. Cl.[6] ...................................................... B32B 7/02
[52] U.S. Cl. ............................ 428/119; 428/98; 428/121; 428/195; 428/200
[58] Field of Search ............................. 428/119, 98, 121, 428/195, 200

[56] References Cited

U.S. PATENT DOCUMENTS

| | | | |
|---|---|---|---|
| 4,295,907 | 10/1981 | Cordts et al. ............................. | 156/246 |
| 4,369,157 | 1/1983 | Conner . | |
| 4,369,224 | 1/1983 | Cordts et al. ............................ | 428/285 |
| 4,705,469 | 11/1987 | Liebl et al. ............................... | 425/117 |
| 4,830,809 | 5/1989 | Liebl et al. ............................... | 264/257 |
| 4,842,571 | 6/1989 | Liebl et al. ............................... | 474/204 |
| 5,047,270 | 9/1991 | Mori et al. ............................... | 428/35.2 |
| 5,071,690 | 12/1991 | Fukuda et al. ........................... | 428/141 |
| 5,100,717 | 3/1992 | Nedzu et al. ............................. | 428/195 |
| 5,122,212 | 6/1992 | Ferguson et al. ........................ | 156/209 |
| 5,304,272 | 4/1994 | Rohrbacker et al. .................... | 156/209 |
| 5,436,063 | 7/1995 | Follett et al. ............................. | 428/224 |
| 5,582,672 | 12/1996 | Follett et al. ............................. | 156/279 |

FOREIGN PATENT DOCUMENTS

| | | |
|---|---|---|
| 0 637 494 | 2/1995 | European Pat. Off. . |
| 36 08 805 | 9/1987 | Germany . |
| 37 38 212 | 5/1989 | Germany . |
| 628 509 | 3/1982 | Switzerland . |

OTHER PUBLICATIONS

Patent Abstracts of Japan, vol. 12, No. 364 (M–747) [3211], Sep. 29, 1988, & JP,A,63 120616 (Mitsubishi Motors Corp), May 25, 1988, See Abstract.

Patent Abstracts of Japan, vol. 7, No. 246 (M–253) [1391], Nov. 2, 1983, & JP,A,58 132529 (Matsushita Denki Sangyo) Aug. 6, 1983, See Abstract.

*Primary Examiner*—Scott W. Houtteman
*Attorney, Agent, or Firm*—Sixbey, Friedman, Leedom & Ferguson; David S. Safran

[57] ABSTRACT

The possibility is demonstrated, during the injection moulding of an upper or lower holding plate, especially of a plastic tray (K), of providing it by an in-mould introduction process in the region of the base surface (22) of the overlay or substrate section with a layer of high antisplip ability which is resistant to multiple cleaning processes.

32 Claims, 3 Drawing Sheets

5,914,170

PROCESS AND MEANS FOR PRODUCING A SUPPORT PART AND A SUPPORT PART PRODUCED WITH IT

BACKGROUND OF THE INVENTION

The invention relates to a process and means for producing a support part, especially a plastic tray, and a support part produced with it, which has a flat bottom and optionally an edge which projects upward on its outside border, the bottom surface of the support part having properties which prevent slipping of articles placed thereon.

Production of plastic trays by injection molding from materials such as acrylobutadiene styrene, styrene acrylonitrile, polypropylene, polycarbonate and the like is known. These plastic trays have adequate stability of shape and resistance to traffic loads and due to their resistance to detergents allow repeated use.

Very often trays of this type are used to serve food on aircraft, but also on railway dining cars and on buses. Of course, the problem arises here that the articles placed thereon must be prevented from slipping on the bottom of the tray during changes of location and vibrations.

If articles to be placed thereon cannot be matched to one another in the conventional manner such that they have space completely within the bottom surface bounded by the edge while largely avoiding intermediate spaces and prevent sliding relative to one another, the effort is made to impart to the bottom surface antislip properties; this is done moreover by molding in a surface profile during injection molding, by loosely inserting a blank of a material with the corresponding adhesive properties, or by cementing a blank with antislip properties.

Texturing of the surface of a tray body of the aforementioned materials does not always lead to success relative to the different materials of the articles to be placed, and for deep and sharp-edged profiling can also cause problems in the cleaning of the tray.

Loose insertion of a film blank with antislip properties causes a part to be handled separately both in serving and clearing, and before cleaning the tray after use it requires disposal, since the loosely inserted blank cannot be reused.

Cementing in a blank with antislip properties makes production of trays more expensive and complex and does not allow their repeated re-use since sufficient resistivity of the adhesive bond between the tray and the cemented-in blanks cannot be expected for the washing temperatures and detergents used.

SUMMARY OF THE INVENTION

The invention is intended to accomplish the objective of devising a process such that a support part, especially a plastic tray, with properties of its bottom surface which prevent slippage of articles placed thereon, can be produced relatively quickly and economically such that its slip resistance is increased and upon frequent use repeated re-use even after intensive cleaning is possible.

The procedure indicated here in injection molding of support parts, especially of plastic trays, can be defined as applying the conventional inmold decoration of injection moldings to molded articles. It has been found that the demand which results from the shape of the covering part or base part when the mold halves of the injection molding machine are closed, i.e., the demand for length of the carrier unused in this working cycle and the long piece or blank of antislip film material to be back-sprayed which is located on the carrier, neither jeopardizes the exact positioning of the blank, the blanks or the segments of this film material in the area of the bottom surface of the support part, nor does it lead to difficulty in removing the carrier after the injection molding process.

Furthermore, it has been shown that the transition areas which remain open in use of the support part between the surface areas not provided with back-sprayed film and the back-sprayed film withstand the mechanical and chemical stresses which take effect in intensive cleaning.

One surface which is open after removing, the support part from the mold or areas of this surface of the bottom of these parts can be textured without the need to provide the corresponding part of one mold half of the injection molding machine with texturing at high cost, since structured films can be used which can be back-sprayed in an injection mold which is equipped in the aforementioned sense with smooth surfaces.

The antislip layer can either itself have the form of a number of blanks containing information, for example handwriting, or areas visible through the surface with information content of contrasting coloring can be inserted in the layer.

In the following, embodiments are detailed individually using the drawing.

DETAILED DESCRIPTION OF THE PREFERRED EMBODIMENT

Figure 1:
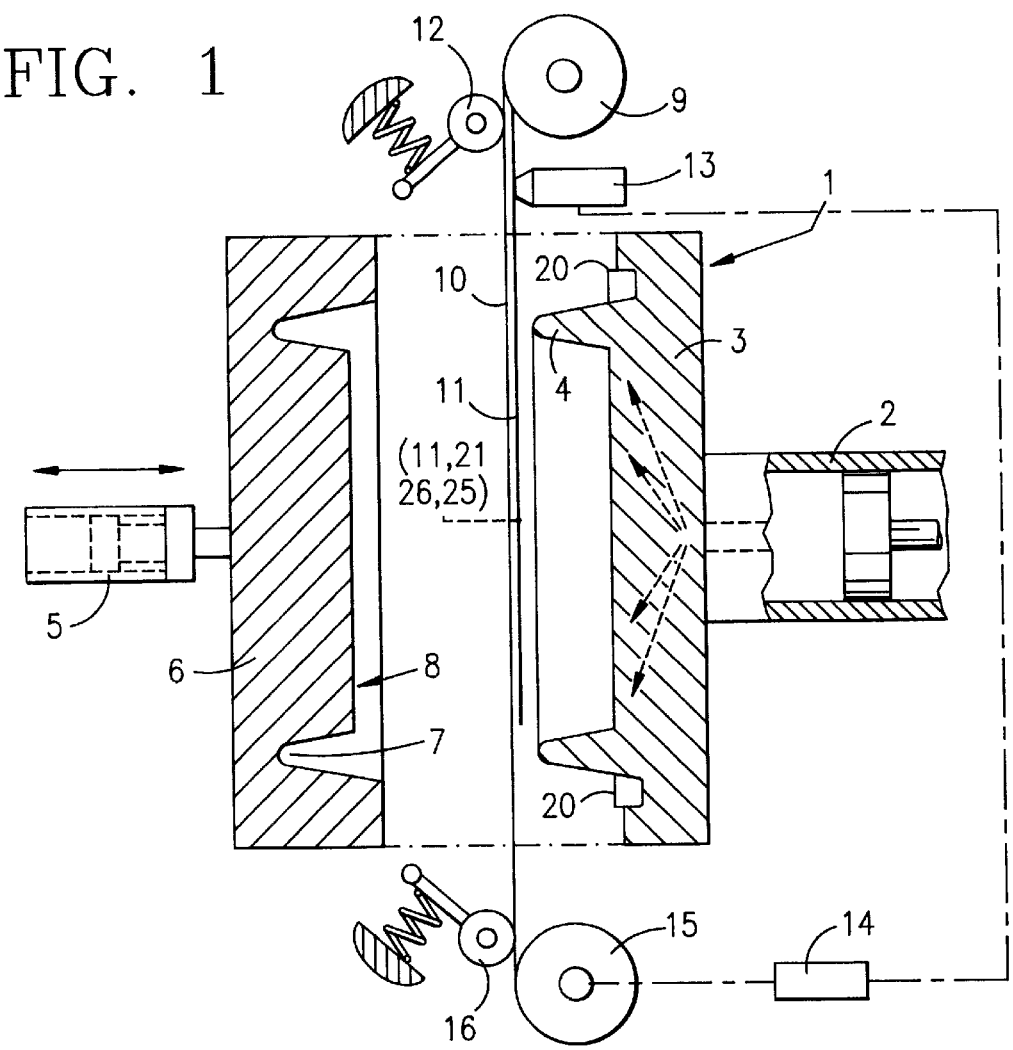
FIG. 1 shows a schematic, partially cutaway means for producing a support part, specifically a plastic tray using the inmold process.

FIG. 1 shows injection molding machine 1 with mold half 3 which is joined to a press 2 and which is profiled on the side facing the mold cavity according to the shape of the tray bottom. Bead 4 which runs peripherally around on this mold, for example, rectangularly in the axial direction, corresponds to the hollow formation of the edge of the tray to be produced.

Mold half 6 which has groove 7 which is opposite and which corresponds to peripheral bead 4 of mold half 3 and plateau 8 which is bordered by the groove can be moved towards mold half 3 in the closed position or away from mold half 3 in the open position according to FIG. 1 by means of drive 5.

On the side of the gap between opened mold halves 3, 6 above injection molding machine 1 there is winder 9 which is provided with a braking device and on which there is a supply of carrier belt 10 with blanks of film material from layer 11 located thereon, one blank or group of blanks of layer 11 at a time being dimensioned and located such that they can each be positioned in alignment with reference to the axial direction within the surface determined by plateau 8.

The blanks of layer 11 can have surface dimensions such that they have room within the boundary of bottom surface 22 of finished plastic tray K.

Layer 11 consists of a material which has a coefficient of friction greater than 0.2, especially greater than 10, compared to plastic and/or ceramic and/or metal. Preferably this layer consists of polyurethane (PU) or it has this material as the initial base. The layer thickness is roughly 10 microns to 100 microns.

Spring-loaded tension roll 12 is assigned to winder 9 and furthermore the arrangement above injection molding machine 1 is completed by detector means 13 which uses marks 17 located on carrier belt 10 to control the positioning of carrier belt 10 or segments from layer 11.

On the opposite side of the gap between opened mold halves 3, 6 under injection molding machine 1 there are receiving winder 15 coupled to controllable drive 14 for holding carrier belt 10 which is becoming free and which is released after release of plastic tray K to be removed from the mold, and another spring-loaded tension roll 16.

Production of plastic tray K proceeds as follows:

First, an unused lengthy piece of carrier belt 10 which a segment of layer 11 of antislip material located thereon is withdrawn by actuating drive 14 from winder 9 against its braking device by means of receiving winder 15 and is positioned with control of drive 14 by detectors 13 which scan marks 17 of carrier belt 10 (FIG. 2) such that it is ensured that after closing mold halves 3,6 and penetration of bead 4 into groove 7 the segment of layer 11 in the axial direction is flush with plateau 8 of mold half 6, and the edging of the segment if desired can have a peripherally uniform distance from the edge of plateau 8 and consequently on finished plastic tray K the antislip layer has a corresponding distance from the transition of the tray bottom surface to the tray edge.

Then press 2 is actuated and the mold cavity formed between closed mold halves 3, 6 is squirted with plastic, layer 11 being back-sprayed. Layer 11 preferably carries another bonding layer 21 (FIGS. 6 and 7) which is located on the side facing mold half 3 and which improves the intimate connection between layer 11 and the plastic layer or other intermediate layers entering the mold cavity.

At this point the mold is opened again, an ejection device not shown in the drawing is actuated, and completed plastic tray K together with back-sprayed antislip layer 11 which is located on its bottom surface is released from carrier belt 10 and plastic tray K is removed from the means. Then, by means of drive 14 and winder 15 a new segment of carrier belt 10 is drawn into injection molding machine 1 by winding up the used carrier belt pieces and the process is repeated.

Figure 2:
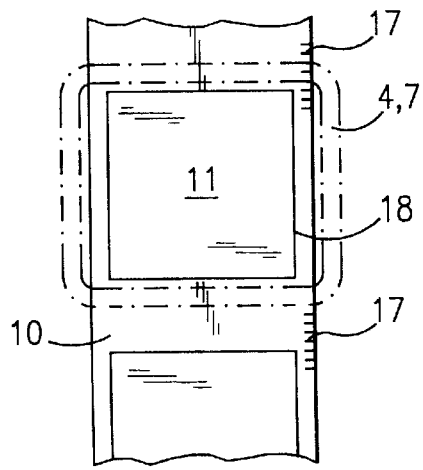
FIG. 2 shows an overhead view of a carrier belt with blanks of the layer of antislip material located thereon.

FIG. 2 shows that the individual segments of layer 11 on carrier belt 10 in this embodiment have a certain distance from one another in the direction in which carrier belt 10 runs through the means, such that stamping processes in the device are unnecessary The corresponding applies if instead of a segment which forms layer 11, within border 18 shown in FIG. 2 a host of geometrical formations, for example, points, stars, block letters, handwriting and the like are attached on carrier belt 10.

That carrier belt 10 must have heat resistance, stability of shape, adhesive properties to layer 11 and separation properties therefrom which are suitable for executing the process is mentioned only for the sake of completeness. Preferably carrier belt 10 consists of polyethylene (PE) or polyvinyl chloride (PVC). Preferably it has a thickness from roughly 15 microns to 300 microns, especially from roughly 30 microns to 150 microns.

Figure 3:
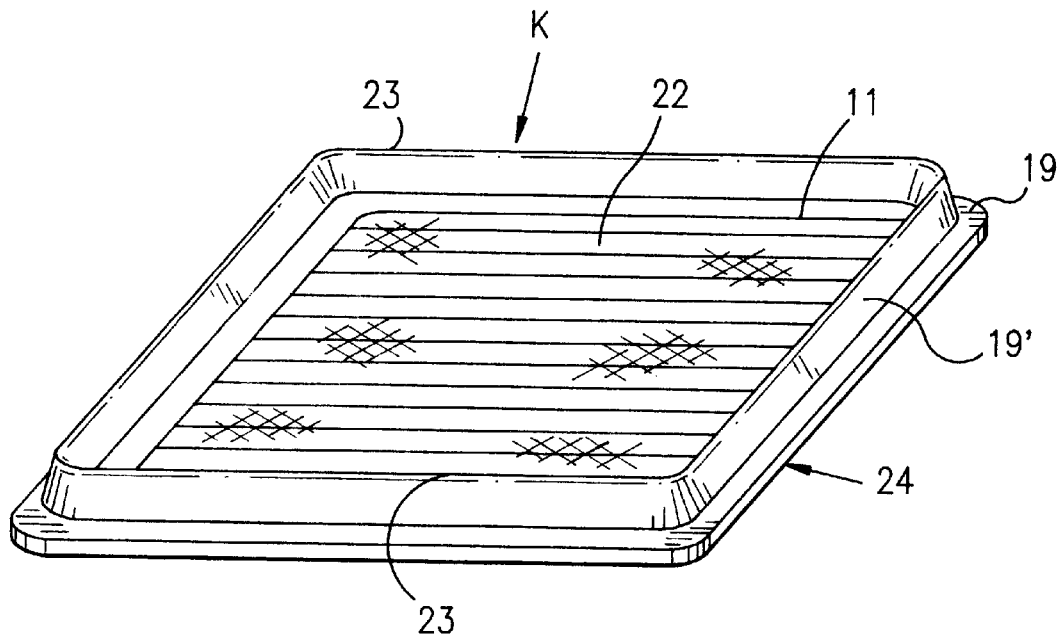
FIG. 3 shows a perspective view of a plastic tray produced using a carrier according to FIG. 2.

Plastic tray K produced using carrier belt 10 according to FIG. 2 in the means according to FIG. 1 is shown in a perspective view in FIG. 3. Outside of edge bead 19' it has narrow, peripherally running edge flange 19 with a design which is understandable to one skilled in the art based on the shape of mold halves 3, 6. Within edge bead 19' on tray bottom surface 22 in intimate connection with the injection molding material there is layer 11 which on the surface from which carrier belt 10 has been removed can be textured or even flat and can also allow a decorative imprint or decorative insert to become visible through a transparent surface layer. The edges of plastic tray K which are parallel to the carrier belt conveyance device are labelled 23.

Figure 4:
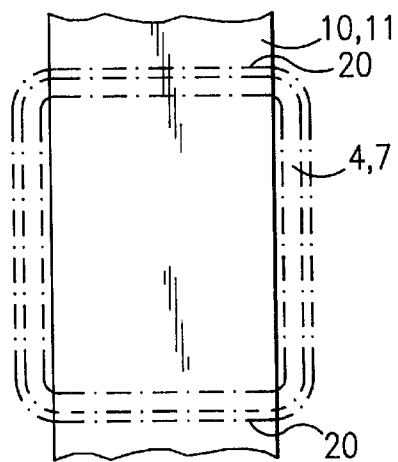
FIG. 4 shows an overhead view of a carrier with a continuous layer of antislip material located thereon.

With the modification shown likewise in FIG. 1 injection molding machine 1 is also suitable for processing of carriers according to FIG. 4 and has a continuous, therefore for example endless layer 11 of antislip material. With this carrier belt 10 plastic trays K of the type shown in perspective in FIG. 5 can be produced. In these plastic trays K antislip layer 11 is drawn onto two opposite sides beyond edge bead 19' and as far as the end of peripherally running flange or edge flange 19. To separate the segments of continuously or endlessly applied layer 11 from the antislip material cutting edges 20 are used on at least two sides of mold half 3 in the area of the outside edge of the mold cavity provided for edge flange 19, the height of cutting edges 20 being dimensioned such that when mold halves 3, 6 are closed they divide only layer 11, but not carrier belt 10 since the latter is needed for continued transport of layer 11 or the segments of layer 11 by means of driven receiving winder 15.

Figure 5:
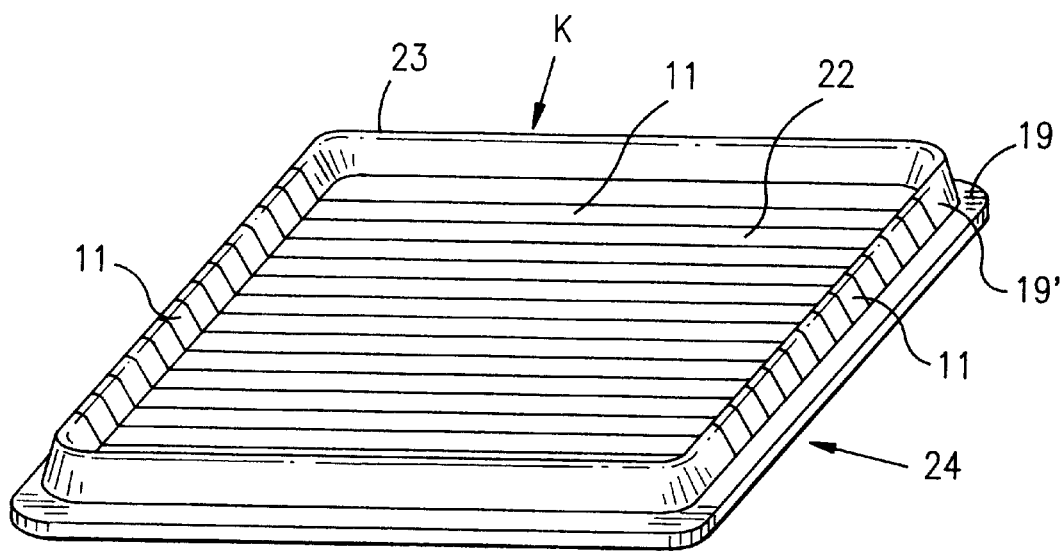
FIG. 5 shows a perspective view of a plastic tray produced using a carrier according to FIG. 4.

If the shape and appearance of finished plastic tray K according to FIG. 5 are desired, this embodiment has the advantage that the process of positioning of the system of layers which is to be transported between winders 9, 15 is relatively uncritical before the mold is closed.

Without impairing the useful properties of plastic tray K produced by injection molding with respect to mechanical strength and cleaning as well as reusability compared to an article of a single material, plastic trays K made with layer 11 allow problem-free operation during serving, during meals, and clearing in means of transportation, especially aircraft, dining cars and busses.

The description of layer 11 with properties which "prevent" slippage of articles placed thereon does not mean than slipping is completely precluded in extreme situations of use. Rather it is important that compared to the initially described tray known beforehand with antislip properties, resistance to slipping is clearly increased. One measure of resistance to slipping is the coefficient of friction of layer 11 which is used. Accordingly layers 11 of plastic are preferably used which have a coefficient of friction higher or much higher than 0.2, for example, 10 or even higher.

Plastic materials for tray body 24 include especially acrylobutadiene styrene (ABS), styrene acrylonitrile (SAN), polypropylene (PP), polycarbonate (PC) or polyamide (PA).

As the material for layer 11 which preferably has a thickness from only 10 microns to 100 microns, especially films are considered which are compatible with the respective material of tray body 24 and which can be joined permanently and undetachably.

Figure 6:
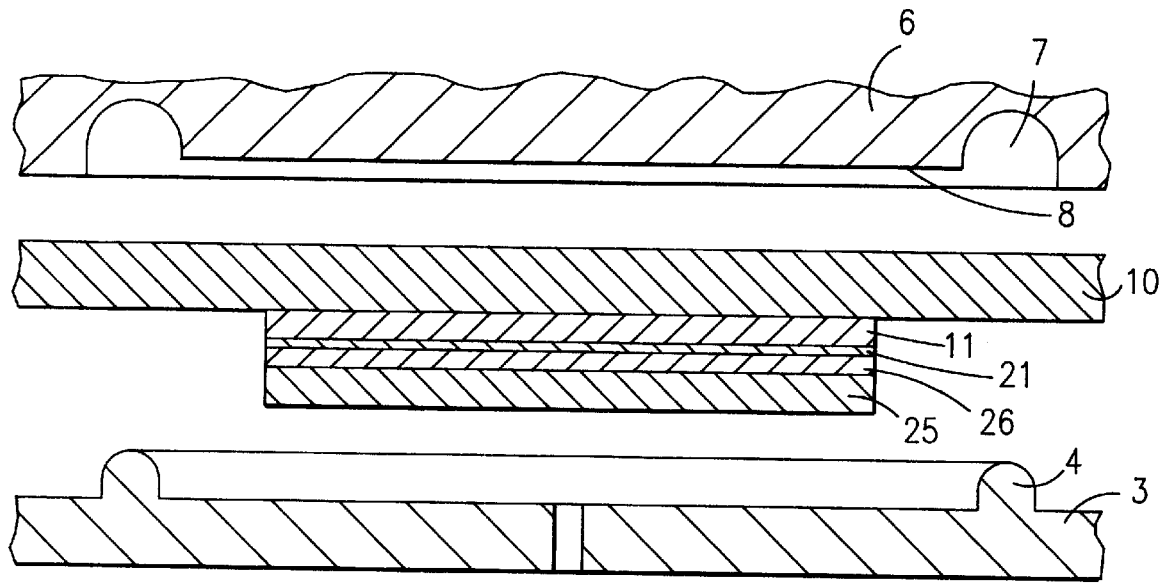
FIG. 6 shows an enlarged segment of a coated carrier belt positioned between the two mold halves of an injection mold and FIG. 7 shows an enlarged segment with back-spraying of the layer.
Figure 7:
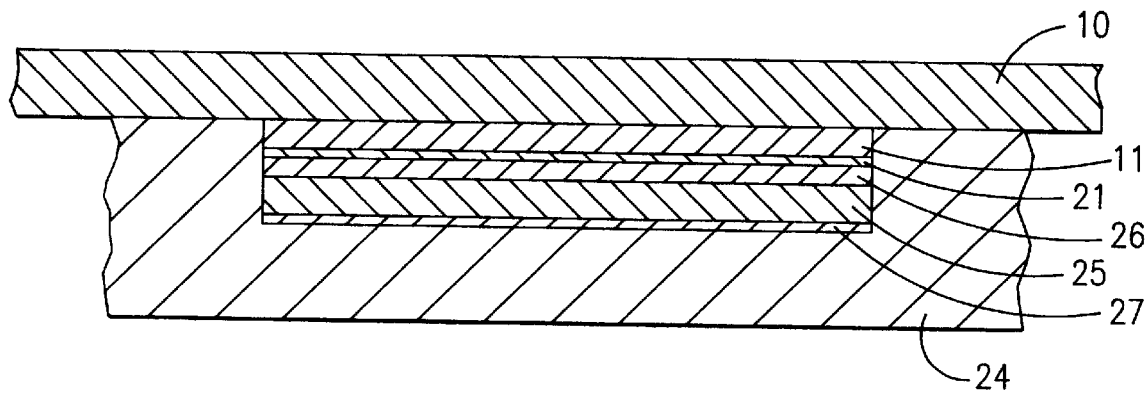

To produce plastic trays K with a decoration which is visible on the bottom surface, instead of layer 11 a sequence of layers according to FIGS. 6 and 7 is used.

In the embodiment according to FIG. 6 decorative carrier film 25 with a thickness for example from 10 microns to 500 microns is provided with decoration 26 of any type. Decoration 26 can be made of one color or can be multicolored and printed for example in silk screen, offset or rotary printing processes.

Then, preferably before setting, drying or polymerization of decorative material 26 adhesive 21 of transparent material, for example a water-soluble cement based on two components, is applied.

Then layer 11 of likewise transparent material is applied to adhesive 21 and advantageously before adhesive 21 has reached its final consistency.

Decorative carrier film 25 consists preferably of a material which joins effectively and permanently to the material of tray body 24. Preferably the material of decorative carrier film 25 contains at least a small portion of the same material which comprises tray body 24 or on which it is based. Preferred materials for decorative carrier film 25 are acrylobutadiene styrene (ABS), polycarbonate (PC) or polystyrene (PS).

Optionally it can be feasible to provide adhesive 27 on the surface of decorative carrier film 25 to which back-spraying of tray body 24 is done, as is illustrated in FIG. 7.

Adhesive 27 consists of plastic, preferably from or on the basis of one material or several of the materials acrylobutadiene styrene (ABS), styrene acrylonitrile (SAN), polycarbonate (PC), polyamide (PA), polyurethane (PUR) or silicone (SI).

Layer sequence 11, 21, 26, 25 is easily removably applied to carrier belt 10. Preferably this takes place as long as layer 11 has not yet set or not yet completely polymerized or is in a soft-elastic state. Adhesion takes place here by the free secondary valencies of carrier belt 10 and layer 11 and preferably for the most part by adhesion forces.

Even if this invention has been detailed preferably for production of plastic trays, the process according to the invention and the means for executing this process can also be used for other support parts of any type with an antislip deposition surface, especially even without a projecting edge which comprises the outside border. In this connection reference is made especially to support parts with a skid-proof deposition surface, as are used for dashboard surfaces, handles of toilet articles or for antislip keyboards.

We claim:

1. Process for producing a support part which has flat bottom with a bottom surface of the support part being provided entirely or partially with a film layer, comprising the steps of:
   introducing or inserting the film layer, along with a carrier belt to which the film layer is removably applied, into an injection mold,
   back-spraying a polymer mass onto the film layer by an injection molding process and joining the film layer to the polymer mass,
   withdrawing the carrier belt from the film layer after setting of the polymer mass and removing of the support part formed of the set polymer mass and film layer joined thereto from the mold,
   wherein the film layer is formed of an anti-slip material which has a coefficient of friction of at least 0.2 relative to plastic and/or ceramic and/or metal and is applied endlessly or in segments on the carrier belt in the form of a coherent layer which is separated from the carrier belt and any unused portions of the film layer after formation of said support part.

2. Support part which has flat bottom, a bottom surface of the support part being provided entirely or partially with a film layer which has been back-sprayed with a polymer mass, wherein the film layer is made of an anti-slip material which has a coefficient of friction of at least 0.2 relative to plastic and/or ceramic and/or metal and which has penetrations or interruptions and is attached within parallel edges of the support part.

3. Process according to claim 1, wherein said anti-slip material has a coefficient of friction of at least 10.

4. Support part according to claim 2, wherein said anti-slip material has a coefficient of friction of at least 10.

5. Process according to claim 1, wherein layer segments which have room within the boundary of the bottom surface of the finished support part are applied to the carrier belt and they are positioned and back-sprayed in the injection mold.

6. Process according to claim 1, wherein decoration is applied to the film layer via a decorative carrier film; wherein a transparent bonding layer is applied to the decoration and if necessary to the surfaces of decorative carrier film which remain free of it, and a transparent layer is applied to the bonding layer to form a layer sequence, and wherein then this layer sequence is easily detachably joined with the surface of the film layer to the carrier belt.

7. Process according to claim 6, wherein an adhesive is applied to the decoration prior to setting, polymerizing or drying thereof.

8. Process according to claim 1, wherein a water-soluble binary adhesive is used as the initial material for cementing (21).

9. Process according to claim 1, wherein the carrier belt is joined to the film layer prior to setting polymerizing or cooling thereof.

10. Process according to claim 9, wherein the carrier belt is formed at least in part of polyethylene (PE) or polyvinylchloride (PVC).

11. Process according to claim 10, wherein a carrier belt with a belt thickness from roughly 15 microns to 300 microns is used.

12. Process according to claim 6, wherein the decorative carrier film is formed from or on the basis of a material selected from the group consisting of acrylobutadiene styrene (ABS), polycarbonate (PC) or polystyrene (PS) with a film thickness from roughly 10 microns to 500 microns.

13. Process according to one of claim 1 wherein a decorative carrier film (25) is used which contains a portion of material which consists of the material used for back-spraying (24).

14. Process according to claim 1, wherein a film layer having a layer thickness from roughly 10 microns to 100 microns is used.

15. Process according to claim 1, wherein a film layer formed from or on the basis of polyurethane (PUR) is used.

16. Process according to claim 1 wherein an endless layer or layer sequence with a surface extension on one or more sides projecting above the support part to be produced is used as said film layer, and wherein a smaller piece is separated from this endless layer or layer sequence, before or after back-spraying with the polymer mass by a cutting means provided in the injection molding tool without dividing the carrier belt.

17. Process according to one of claim 1 wherein for back-spraying of film layer (11) or layer sequence (11, 21, 26, 25) acrylobutadiene styrene (ABS), styrene acrylonitrile (SAN) or polycarbonate (PC) is used.

18. Means for producing a support part which has a flat bottom, a bottom surface of the support part being provided entirely or partially with an anti-slip film layer or layer sequence, comprising an injection molding machine having an injection mold, a carrier belt and means for applying the anti-slip film layer or layer sequence to the carrier belt and introducing or inserting the film layer or layer sequence together with the carrier belt into the injection mold means for back-spraying the film layer or layer sequence with a polymer mass, and means for removing the support part from the mold after setting of the polymer mass; wherein on one side of a gap between mold halves of the injection molding machine there is supply roll with the carrier belt and the anti-slip film layer or layer sequence located thereon, and on the opposite side of this gap, there is a receiving device, which can be driven in a controlled manner, for receiving the carrier belt and unused parts of the anti-slip layer or layer sequence after removal of support part therefrom.

19. Means according to claim 18, wherein detector means for scanning marks applied on the carrier belt and control means which are influenced by detector means for the receiving device for the carrier belt are attached to the injection molding machine.

20. Means according to claim 18, wherein on the outside edge of the surface of one of mold halves of the injection molding machine, at a surface bordering the mold cavity, there is a blade or cutting edge for cutting the film layer or layer sequence without cutting the carrier belt.

21. Means according to claim 18, wherein the carrier belt is conveyed between the supply roll and the receiving device and has a width transversely to its conveyance direction which is less than or equal to the distance between edges of the mold cavity forming the support part which are parallel to the carrier belt conveyance direction.

22. Support part, according to claim 2, wherein the film layers at least on two opposite sides of the support part is attached on parallel edges.

23. Support part according to claim 2, wherein there is a bonding layer between the anti-slip film layer and the back-sprayed polymer mass.

24. Support part according to claim 2, wherein the back-sprayed polymer mass is formed of one or several of the compounds selected from the group consisting of acrylobutadiene styrene (ABS), styrene acrylonitrile (SAN), polypropylene (PP), polycarbonate (PC) or polyamide (PA).

25. Support part according to claim 23, wherein the bonding layer is formed of one or several of the compounds selected from the group consisting of acrylobutadiene styrene (ABS), styrene acrylonitrile (SAN), polycarbonate (PC), polyamide (PA), polyurethane (PUR) or silicone (SI).

26. Support part according to claim 2, wherein, on the back-sprayed polymer mass there are the following layers in succession:

a decorative carrier film;

a decoration;

a bonding layer of transparent material; and said layer of anti-slip material, said anti-slip material being a transparent material having a coefficient of at least 10.

27. Support part according to claim 26, wherein the material of the decorative carrier film contains a portion of that material which comprises back-sprayed polymer mass as the base.

28. Support part according to claim 26, wherein there is a bonding layer between the back-sprayed polymer mass and the decorative carrier film.

29. Support part according to one of claim 2 wherein the anti-slip film layer (11) has a thickness from roughly 10 microns to 100 microns.

30. Support part according to one of claim 2 wherein the anti-slip film layer (11) consists of polyurethane (PUR) or is based on polyurethane (PUR).

31. Support part according to claim 26, wherein the decorative carrier film is formed at least in part of a material selected from the group consisting of acrylobutadiene styrene (ABS), polycarbonate (PC), or polystyrene (PS).

32. Support part according to claim 26, wherein the thickness of the decorative carrier film is roughly 10 microns to 500 microns.

* * * * *